Feb. 16, 1960     H. C. GUSTAFSON     2,924,950
HEATER FOR AIR LINE OILERS
Filed June 16, 1958     2 Sheets-Sheet 1
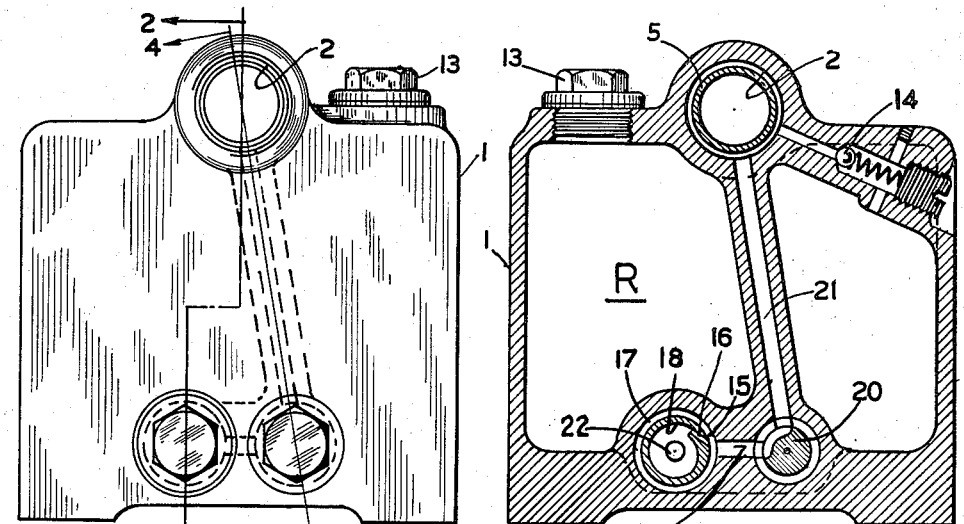
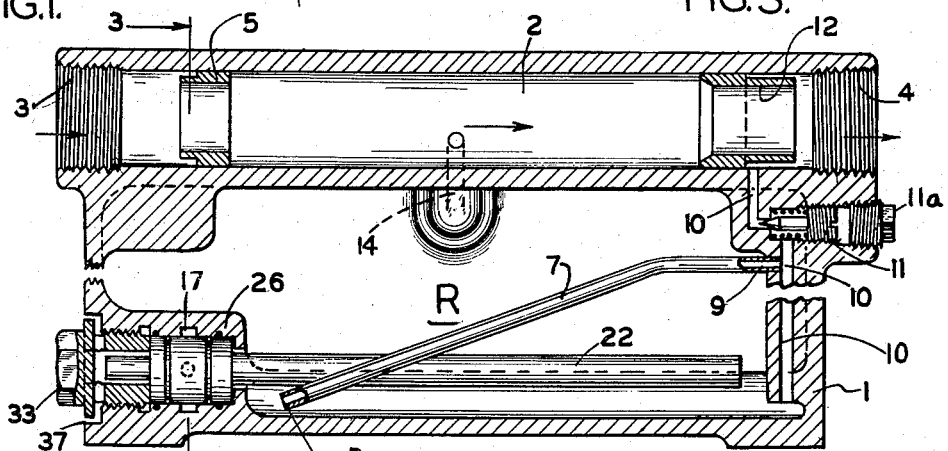
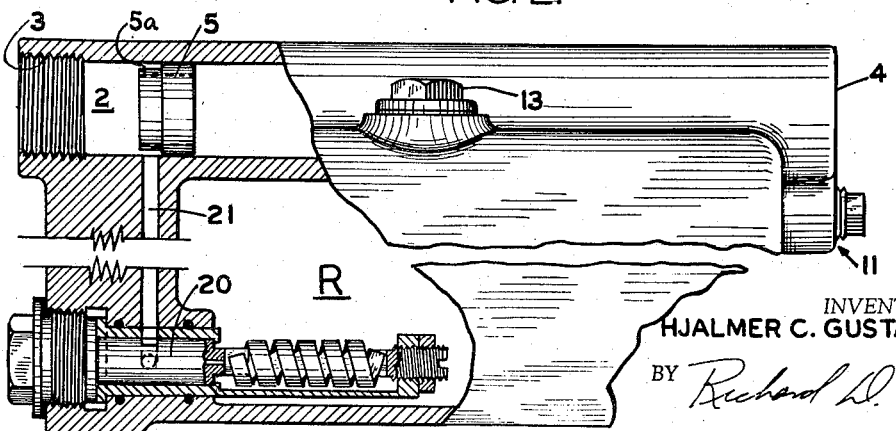
INVENTOR.
HJALMER C. GUSTAFSON
BY Richard D. Law
ATTORNEY Feb. 16, 1960     H. C. GUSTAFSON     2,924,950
HEATER FOR AIR LINE OILERS Filed June 16, 1958     2 Sheets-Sheet 2

INVENTOR.
HJALMER C. GUSTAFSON
BY Richard D. Law
ATTORNEY

United States Patent Office 2,924,950
Patented Feb. 16, 1960

2,924,950

HEATER FOR AIR LINE OILERS

Hjalmer C. Gustafson, Denver, Colo.

Application June 16, 1958, Serial No. 742,151

6 Claims. (Cl. 62—5)

This invention relates to airline oiling devices, and more particularly to a heater for air line oilers which is arranged to heat the oil in such an air line oiler maintaining the oil fluid under low temperature conditions.

Air line oilers are practically standard equipment on every installation using air to operate various types of equipment and air tools, such as air hammers, drills, air motors, and the like. Optimum operation of an air line oiler requires that a small amount of oil be continuously atomized into the air stream. Usually a venturi section with a restricted suction inlet is installed in an air line so that the amount of oil atomized into the air stream is determined by the amount of air passing through the air line. Air line oilers operate satisfactorily when the viscosity of the oil is low enough to permit an even and uniform flow of oil under the relatively small forces involved. Under low temperature conditions, however, the viscosity of the lubricating oil increases substantially and thereby preventing a free flow of oil thus starving the equipment which they are suppose to lubricate.

Included among the objects and advantages of the present invention is to provide a heating device for an air line lubricator which utilizes a minor amount of air from the air line to heat the oil in the lubricator oil reservoir. The invention, also, provides an automatic control for such a heater to prevent overheating of the oil and to substantially maintain the oil at a constant temperature thereby maintaining a constant viscosity of oil and opimum efficiency of the oiler. The invention includes a heating device which heats the oil without contamination, and with an insignificant loss of air. The heating device is simply and economically manufactured, and rugged enough to withstand field use.

These and other objects and advantages of the invention may be readily ascertained by referring to the following description and appended drawings in which:

Fig. 1 is an end elevational view of an air line oiler incorporating a heating device according to the invention;

Fig. 2 is a cross-sectional view of the heating device taken along section lines 2—2 of Fig. 1;

Fig. 3 is a cross-sectional view of the heating device invention taken along section line 3—3 of Fig. 2;

Fig. 4 is a partial sectional view of an oiler of the invention taken along section line 4—4 of Fig. 1;

Figure 5:
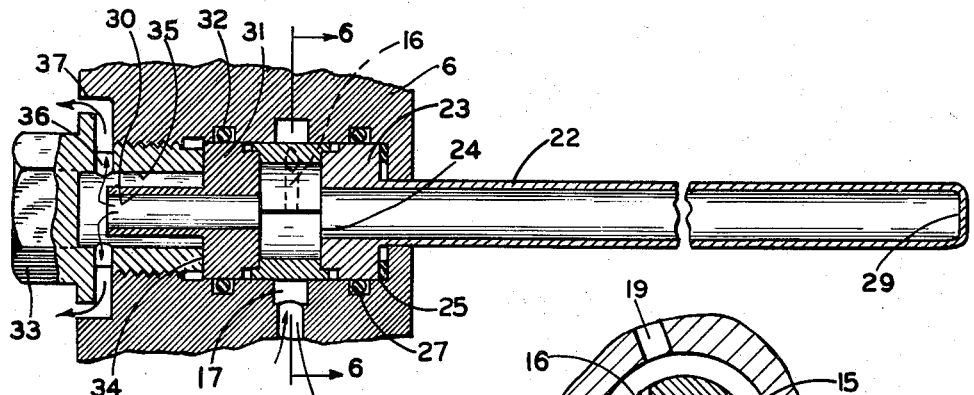
Fig. 5 is an enlarged detailed view of the heating device according to the invention.

The heating device of the invention may be utilized with various types of air line oilers whether of the suction type or the drip type. One specific suction type is illustrated in the drawings to show the relationship of the various parts of an oiler with the heating arrangement. This type of oiler is generally used on air lines for tools and equipment used in construction. Since most construction is conducted in the open, such oilers are subjected to extremes of temperature. The general elements found in a suction type air line lubricator includes a means for connection into an air line, an oil reservoir, a small conduit for conveying oil from the reservoir to the line, and a means for atomizing the oil so conveyed to the air line.

In the air line oiler illustrated in the drawings, a main body 1 includes an air line passage 2 which has threaded connections for assembly with an air line including threaded inlet 3 and threaded outlet 4. A substantially imperforate oil reservoir is provided internally of the body 1, and an oil feed tube 7 is arranged with its lower outlet 8 adjacent the bottom of the reservoir and its upper end 9 adjacent a small passage 10 leading to a volume control or needle valve 11. A venturi plug or section 12 is arranged in the passage 2 and the upper end of the passage 10 discharges oil into the suction side of the venturi section. A plug 13 in the upper part of the reservoir provides means for filling the reservoir R with oil. A ball check, oil reservoir pressure balancing valve 14 provides means for balancing or equalizing the pressure in the reservoir with the line pressure at times when equipment is suddenly turned off or on creating a back flow of air into the reservoir which might result in a glob of oil being carried into the air line.

Figure 6:
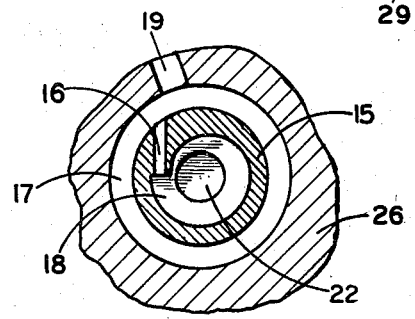
Fig. 6 is a sectional view of an air jet and inlet for the heating tube of Fig. 5 taken along section lines 6—6.

The heating device of the present invention operates somewhat similarly to the Hilsch tube described in the May 1947 issue of Popular Science. The heating device shown in detail in Figs. 5 and 6 includes manifold 15 and a small air jet 16 providing a communication between air supply space 17 and an off center spiral chamber 18. Air for the supply space 17 is supplied through a passageway 19, Fig. 3, from a rotary valve 20, explained below, which controls the air supply line 21 from the main air line passage 2. An elongated tube 22 has a flange 23 secured to an open end 24 and the opposite end 29 is closed. The flange 23 seats in a bore 25 in a boss 26 on the wall of the reservoir and which projects into the reservoir R. An O ring seal 27 provides a sealing means for the flange 23. Manifold 15 is mounted adjacent the open end of the tube 22 so that the tube communicates with the eccentric chamber 18 permitting a spiral flow of air therein. The tube 22 extends into the oil reservoir and is substantially imperforate so that substantially no air leaks from the heating device into the reservoir. A short tube 30, open at both ends, is secured in the bore 25 on the opposite side of the off-center block 15. The tube 30 includes a flange 31 secured around one end thereof, and an O ring seal 32 seals the same in the passage 25. A plug 33 is threaded into the passage 25 and its inner end 34 abuts against the flange 31 tightly securing the parts of the heating device in the bore. The cap or plug 33 includes an inner bore or cavity 35 into which the tube 30 extends with sufficient clearance for a free flow of air. A plurality of small holes 36 bored in the plug 33 provides a passage for air from the cavity 35 into an open recess 37 in which the plug 33 seats against 31. The plug 33 is provided with clearance in the recess so that air may freely flow from the cavity 35.

The operation of the heating device is as follows:

Oil is filled into the reservoir R through the cap 13, and the lubricator secured in an air line by means of the threaded connections 3 and 4. Air passes through the device as the tools require, and passage of the stream of air through the venturi 12 draws oil up through the passage 10 from the reservoir R by means of the supply tube 7. A small annular ring 5 is placed in the air line adjacent the lateral passage 21 forming an annulus 5a which produces an area for introducing air through passage 21 into the heating device. Air passing through the tube 21 is controlled by a rotary valve 20, which may be automatically controlled or manually controlled, and hence into the off-set chamber 18. The air from the supply annulus 17 passes at high velocity through the jet passage 16 into the chamber 18 where the air is swirled. As the compressed air passed into the passageway 16, the velocity greatly increases and the air is cooled. The high velocity, cooled air enters the spiral chamber 18 where there is a split of the air. The warmest part of the air is thrown to the outside and coolest is forced toward the center of the swirling air. Tube 22 is larger than tube 30 and the warmest air swirls into the tube 22. The cold air remains substantially in the center of the whirlpool formed in the chamber 18 and is drawn off through tube 30. As the warmer air swirls into larger tube 22, it tends to spiral through the tube against the tube wall. The return air spirals back through the center of the tube 22 and is picked up in the swirling cooled air which passes out through tube 30. In tube 22 the outer band of warmer air gives up its heat to the tube which in turns heats the oil reservoir.

For an oiler of a size sufficient to supply an inch or an inch and a half air line, a flow of about five cubic feet per minute of air from the air line is sufficient to heat the oil by means of the heating tube of the invention. This amount of air is substantially less than the loss through the connections in such lines as used for installations in construction, mining and the like. Thus, for the purposes of heating the loss is negligible. By having the valve 20 arranged so that it will not completely close, a minor amount of air may be passed through the heating device at all times and the air maintains the outlet 37 free from dirt and the like. At very small flows of air there is not sufficient air to significantly heat the oil. Also, by having the air flow at about five cubic feet per minute, the temperature of oil in the reservoir may be raised to about 130° F. in a short time. The delay in heating normally will not hamper construction operation since in such work, especially outside work, the compressor is generally started a substantial period before the tools are actually operated. Thus in extremely cold weather the compressor is normally operated long enough to heat the oil before the tools are actually used and require lubrication.

Figure 7:
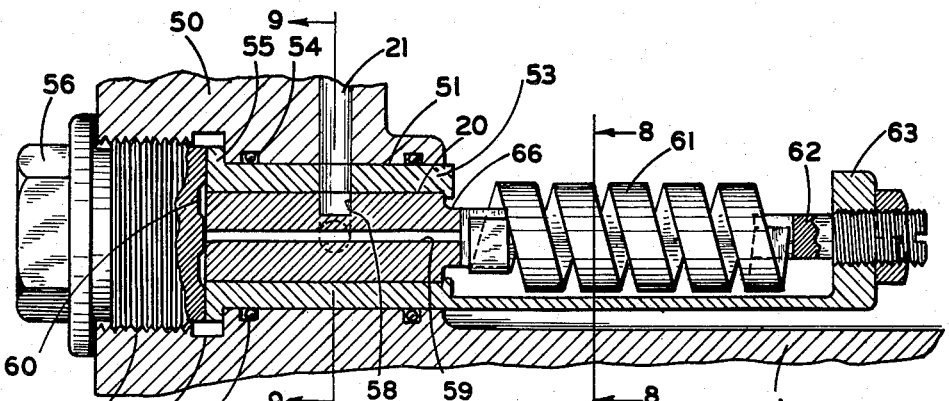
Fig. 7 is an enlarged detail of a temperature controller and associated valve.
Figure 9:
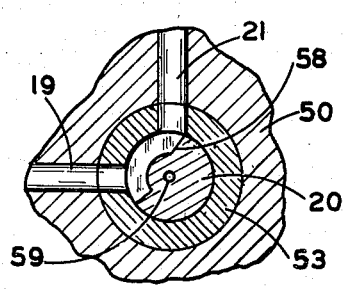
Figure 8:
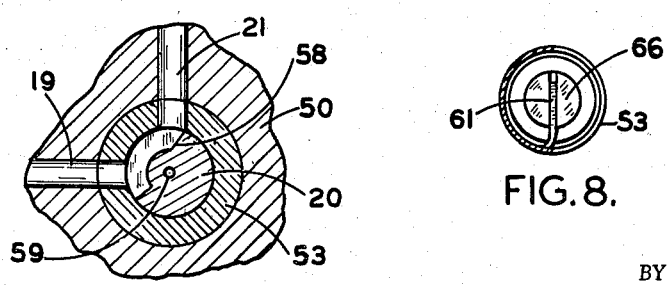
Fig. 8 is a sectional view of the heating element taken along section lines 8—8 of Fig. 7; and, Fig. 9 is a sectional view of the valve mechanism of the control of Fig. 7 taken along section lines 9—9.

As pointed out above, the valve 20 may be a manually controlled valve or it may be an automatic valve, such as the one shown in Figs. 7 through 9, inclusive. In the device illustrated, a boss or block 50 mounted on the wall of body 1 of the oiler is provided with a bore 51 which communicates with a threaded passage 52 and the reservoir R. A bushing 53 is secured in the bore 51 and is prevented from leaking by means of O ring seals 54. A flange 55 mounted on the bushing 53 is arranged to seat in the bottom of the threaded bore 52, and a plug 56 tightly secures the bushing in place. A clearance space 57 is provided to insure proper seating of the parts. A rotary plug valve 20 is rotatably secured in the bushing 53, and a small groove 58 extending a portion around the outside of the plug valve provides a passage for interconnecting the air inlet 21 and the passage 19. A small central bore 59 extends through the plug 20 and provides means for balancing pressure across it. An annular groove 60 in the plug 56 extends across the joint of the plug and the bushing 53 in position to substantially maintain the pressure across the valve substantially equal. In this connection it is noted that the valve being rotatable in the bushing permits some leakage of air, and the pressure in the groove 60 should substantially equal to the pressure in the reservoir. A boss 66 on the end of the plug valve 20 is secured to a spiral, bi-metal heat sensitive element 61. The opposite end of the element 61 is secured to a stud 62 mounted in an arm 63 depending from the bushing 53. The stud 62 is threaded in the arm 63 so that it may adjust the spring tension of element 61 and thereby control the movement of the plug valve 20.

The operation of the valve is controlled by the temperature of the oil which determines action of the bi-metal element 61. When the temperature of the oil is low the rotary valve 20 should be fully opened to permit free flow of air from passage 21 into passage 19. As the oil heats up, however, the spiral bi-metal element expands and turns the valve restricting the passage 21. The temperature of the oil may thus be maintained in a rather narrow temperature range. The bi-metal element should be adjusted so that the valve 20 is not completely closed when the oil is at its proper temperature to permit bleeding a small amount of air through the heating tube to insure that the outlet 37 remains clear of dirt and debris.

While the invention has been described by reference to a specific device there is no intent to limit the concept or spirit of the invention to the precise details so set forth, except insofar as defined in the following claims.

I claim:

1. An oil heater for air line lubricators having an oil reservoir comprising an enclosed spiral chamber, an eccentrically direct inlet of smaller cross-sectional dimensions than said chamber providing communication from a source of air under pressure providing a high velocity stream of air into said chamber, a tube having a closed end interconnected with a side of said spiral chamber and extending axially from said spiral chamber, an open tube interconnected with said spiral chamber and extending axially from the opposite side of said chamber, said open tube having a smaller diameter than said closed tube and providing the only air exhaust for said device, said closed end tube extending into the oil reservoir to be heated, and means inclusive of a conduit from the air line for supplying a low volume, high velocity stream of air through said inlet into said chamber whereby said closed tube is heated and said open tube is cooled.

2. An oil heater for air line lubricators having an oil reservoir comprising an axially narrow spiral chamber, an eccentric inlet of smaller cross-sectional dimensions than said chamber directed into and generally along the wall of said chamber, a tube having a closed end interconnected with and closing one side of said spiral chamber and extending axially from said spiral chamber, an open tube interconnected with said spiral chamber and extending axially from the opposite side of said chamber, said open tube having a smaller diameter than said closed tube and providing the only air exhaust for said device, said closed end tube extending into the oil reservoir to be heated, and means inclusive of a conduit from the air line for supplying a variable quantity of a high velocity air stream through said inlet into said chamber whereby said closed tube is heated and said open tube is cooled.

3. An oil heater for air line lubricators having an oil reservoir comprising a radially spiralled chamber having an eccentric air inlet, said inlet having a smaller cross-sectional dimension than said chamber and interconnected with a source of air under pressure, valve means for controlling flow of air through said inlet, a closed tube interconnected with said chamber and extending axially therefrom, an open tube interconnected with said chamber and extending axially from the opposite side of said chamber, said open tube having a smaller diameter than said closed tube and providing the only air exhaust from said device, said closed end tube extending into the oil reservoir, temperature responsive means mounted in contact with such an oil reservoir and interconnected with said valve means for controlling the flow of air into said inlet, and means inclusive of a conduit from the air line for supplying a low volume, high velocity stream of air into said valve for passage through said inlet into said chamber whereby heated air passes into said closed tube and cooled air passes through said open tube.

4. A device according to claim 3 in which the valve means is a rotary valve interconnected with said temperature responsive means.

5. An oil heater for air line lubricators having an oil reservoir comprising a radially spiralled chamber having an eccentric air inlet directed along the spiral surface of the chamber, said inlet having a smaller cross-sectional dimension than said chamber and interconnected with a source of air under pressure, valve means for controlling flow of air through said inlet, a closed tube interconnected with said chamber and extending axially therefrom, an open tube interconnected with said chamber and extending axially from the opposite side of said chamber, said open tube having a smaller diameter than said closed tube and providing the only air exhaust from said device, said closed end tube extending into the oil reservoir, and means inclusive of a conduit from the air line for supplying a low volume, high velocity stream of air into said valve for passage through said inlet into said chamber whereby heated air passes into said closed tube and cooled air passes through said open tube.

6. An air line oiler comprising a casing having an oil reservoir and a passage for air under pressure therethrough and having means for conducting a small flow of oil from the reservoir for dispersion into said passage, a heater disposed within said reservoir and having an eccentric inlet for swirling entering air, a closed tube extending into the oil reservoir and an open outlet tube terminating externally of the casing, said open tube having smaller cross-sectional dimensions than said closed tube, said heater including means for conducting a low volume of high velocity air from said passage into said inlet whereby said closed tube is heated and the outlet tube is cooled, and means for controlling the flow of air to said inlet.

References Cited in the file of this patent

UNITED STATES PATENTS 2,607,441   Gillerstrom _____ Aug. 19, 1952

FOREIGN PATENTS 858,260   Germany _____ Dec. 4, 1952